(12) United States Patent
Yokozeki

(10) Patent No.: US 9,823,331 B2
(45) Date of Patent: Nov. 21, 2017

(54) OBJECT DETECTING APPARATUS, IMAGE CAPTURING APPARATUS, METHOD FOR CONTROLLING OBJECT DETECTING APPARATUS, AND STORAGE MEDIUM

(71) Applicant: CANON KABUSHIKI KAISHA, Tokyo (JP)

(72) Inventor: Makoto Yokozeki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 94 days.

(21) Appl. No.: 14/549,436

(22) Filed: Nov. 20, 2014

(65) Prior Publication Data

US 2015/0146010 A1 May 28, 2015

(30) Foreign Application Priority Data

Nov. 26, 2013 (JP) ................................. 2013-244244

(51) Int. Cl.
*H04N 9/80* (2006.01)
*G11B 27/00* (2006.01)
*H04N 5/93* (2006.01)
*G01S 3/786* (2006.01)
*H04N 5/232* (2006.01)
*G06K 9/00* (2006.01)
*H04N 5/92* (2006.01)
*H04N 5/225* (2006.01)

(52) U.S. Cl.
CPC ........ *G01S 3/7864* (2013.01); *G06K 9/00228* (2013.01); *G06K 9/00295* (2013.01); *H04N 5/23212* (2013.01); *H04N 5/23219* (2013.01); *H04N 5/23245* (2013.01); *H04N 5/23293* (2013.01)

(58) Field of Classification Search
CPC ............ H04N 5/225; H04N 9/80; H04N 5/93; H04N 5/92; G11B 27/00
USPC ........ 386/239, 280, 278, 326, 353; 348/169, 348/170, 171, 172
See application file for complete search history.

(56) References Cited

U.S. PATENT DOCUMENTS 6,288,974 B1 * 9/2001 Nelson .................... G01S 17/89
367/13
6,556,775 B1 * 4/2003 Shimada ................ H04N 5/272
348/E5.058

(Continued)

FOREIGN PATENT DOCUMENTS

JP 2009-211311 A 9/2009
JP 2010-141847 A 6/2010

OTHER PUBLICATIONS

Machine Translation for JP 2010-141847, Dec. 15, 2008, Tsuji Ryosuke, "Image Processor and Method of Processing Image".*

*Primary Examiner* — Daquan Zhao
(74) *Attorney, Agent, or Firm* — Canon USA, Inc., IP Division

(57) ABSTRACT

An object detecting apparatus includes a detecting unit configured to detect an area of a predetermined object from an image, a calculating unit configured to calculate an evaluation value on the area detected by the detecting unit, and a control unit configured, when the evaluation value satisfies a predetermined criterion, to determine that the area is the predetermined object. The predetermined criterion is set depending on an amount of distortion of an image displayed on a display unit.

31 Claims, 12 Drawing Sheets

(56) References Cited

U.S. PATENT DOCUMENTS

| | | | | |
|---|---|---|---|---|
| 7,551,770 B2* | 6/2009 | Harman | ............... | G06T 7/0022 |
| | | | | 345/419 |
| 7,650,058 B1* | 1/2010 | Garoutte | .......... | G08B 13/19604 |
| | | | | 382/103 |
| 8,994,785 B2* | 3/2015 | Seo | .................... | H04N 5/23238 |
| | | | | 348/36 |
| 2006/0126889 A1* | 6/2006 | Nakamura | ............ | G06T 1/0064 |
| | | | | 382/100 |
| 2007/0014457 A1* | 1/2007 | Jolly | .................... | G06T 7/0083 |
| | | | | 382/128 |
| 2008/0291505 A1* | 11/2008 | Shih | .................... | H04N 1/4078 |
| | | | | 358/461 |
| 2010/0149341 A1* | 6/2010 | Marks | .................... | A63F 13/06 |
| | | | | 348/169 |
| 2010/0302402 A1* | 12/2010 | Asajima | ............... | G06T 3/0093 |
| | | | | 348/222.1 |
| 2012/0182416 A1* | 7/2012 | Kawaguchi | .......... | H04N 9/3185 |
| | | | | 348/128 |
| 2013/0293672 A1* | 11/2013 | Suzuki | ............... | H04N 5/23238 |
| | | | | 348/36 |
| 2013/0321260 A1* | 12/2013 | Joo | ....................... | G09G 5/005 |
| | | | | 345/156 |
| 2015/0084755 A1* | 3/2015 | Chen | ....................... | G08G 1/16 |
| | | | | 340/435 |
| 2015/0341607 A1* | 11/2015 | Kobayashi | .......... | H04N 9/3185 |
| | | | | 348/744 |

* cited by examiner

FRAME t-1

FRAME t

FIG. 3

| ID | CORDINATE INFORMATION | | SIZE | ANGLE | NUMBER OF CONTINUOUS DETECTION TIMES OF RELIABILIY DEGREE | | | | | FACE DETERMINATION | UPDATE |
|---|---|---|---|---|---|---|---|---|---|---|---|
| | X-COORDINATE | Y-COORDINATE | | | RELIABILITY 1 | RELIABILITY 2 | ... | RELIABILITY 9 | RELIABILITY 10 | | |
| 1 | x(1) | y(1) | s(1) | d(1) | L1(1) | L2(1) | ... | L9(1) | L10(1) | 1 | 1 |
| 2 | x(2) | y(2) | s(2) | d(2) | L1(2) | L2(2) | ... | L9(2) | L10(2) | 1 | 1 |
| 3 | x(3) | y(3) | s(3) | d(3) | L1(3) | L2(3) | ... | L9(3) | L10(3) | 0 | 1 |
| 4 | x(4) | y(4) | s(4) | d(4) | L1(4) | L2(4) | ... | L9(4) | L10(4) | 0 | 1 |

FRAME t-2

FRAME t-1

FRAME t

| ID | CORDINATE INFORMATION || SIZE | ANGLE | NUMBER OF CONTINUOUS DETECTION TIMES OF RELIABILITY DEGREE ||||| MOVING DIRECTION | MOVING DISTANCE | FACE DETERMINATION | UPDATE |
| | X-COORDINATE | Y-COORDINATE | | | RELIABILITY 1 | RELIABILITY 2 | ... | RELIABILITY 9 | RELIABILITY 10 | | | | |
| --- | --- | --- | --- | --- | --- | --- | --- | --- | --- | --- | --- | --- | --- |
| 1 | x(1) | y(1) | s(1) | d(1) | L1(1) | L2(1) | ... | L9(1) | L10(1) | w(1) | m(1) | 1 | 1 |
| 2 | x(2) | y(2) | s(2) | d(2) | L1(2) | L2(2) | ... | L9(2) | L10(2) | w(2) | m(2) | 1 | 1 |
| 3 | x(3) | y(3) | s(3) | d(3) | L1(3) | L2(3) | ... | L9(3) | L10(3) | w(3) | m(3) | 0 | 1 |
| 4 | x(4) | y(4) | s(4) | d(4) | L1(4) | L2(4) | ... | L9(4) | L10(4) | w(4) | m(4) | 0 | 1 |
| | | | | | | | | | | | | | |

OBJECT DETECTING APPARATUS, IMAGE CAPTURING APPARATUS, METHOD FOR CONTROLLING OBJECT DETECTING APPARATUS, AND STORAGE MEDIUM

BACKGROUND

Field

Aspects of the present invention generally relate to an object detecting apparatus, an image capturing apparatus, a method for controlling an object detecting apparatus, and a storage medium.

Description of the Related Art

An image processing technique for detecting a specific object (a person, an animal, a specific object, etc.) from an image is known. For example, an image processing technique for detecting a human face as an object can be used in many fields, such as a TV conference, a man-machine interface, security, a monitoring system for tracking a human face, and image compression.

Digital cameras and digital video cameras detect, for example, a human face, from a captured image and implement exposure control and focus detection control based on the result of face detection. For the image processing technique for detecting a specific object from an image, various methods have been proposed. Most of the methods are based on pattern matching. One example is a method for clipping partial images at a plurality of different positions on an image and determining whether or not the partial images are images of a face area to detect a face area on the image. Whether the partial images are images of a face area or not can be determined by template matching or using an identifier that has learned the characteristics of a face by a learning method of a neural network.

Any of the methods generally calculate the degree of reliability indicating the degree of likelihood that the partial images are images of an object area on the basis of the patterns of the partial images and detect partial images whose degrees of reliability exceed a predetermined threshold value as images of the object area. Japanese Patent Laid-Open No. 2010-141847 discloses a method of storing the history of the degrees of reliability of detected areas and changing the number of detection times or the time until the object is detected on the basis of the degree of reliability.

However, if an object to be detected is present in a target image having large distortion, the object is significantly distorted. Thus, the method disclosed in Japanese Patent Laid-Open No. 2010-141847 may decrease the degree of reliability of the object in the significantly distorted area, thus making it impossible to perform determination of the detected object.

SUMMARY

An aspect the present invention generally allows detecting an object with stability while reducing false detection even from an image with large distortion.

According to an aspect of the present invention, an object detecting apparatus includes a detecting unit configured to detect an area of a predetermined object from an image, a calculating unit configured to calculate an evaluation value on the area detected by the detecting unit, and a control unit configured, when the evaluation value satisfies a predetermined criterion, to determine that the area is the predetermined object. The predetermined criterion is set depending on an amount of distortion of an image displayed on a display unit.

Further features of the present disclosure will become apparent from the following description of exemplary embodiments with reference to the attached drawings.

BRIEF DESCRIPTION OF THE DRAWINGS

FIG. 3 is a diagram showing an example of an object list of the image capturing apparatus according to the first embodiment.

FIG. 7A is a schematic diagram of a determination criterion of the image capturing apparatus according to the first embodiment.

FIG. 7B is a schematic diagram of a determination criterion of the image capturing apparatus according to the first embodiment.

FIG. 12 is a diagram showing an example of an object list of the image capturing apparatus according to the second embodiment.

DESCRIPTION OF THE EMBODIMENTS

Embodiments of the present disclosure will be described with reference to the drawings. The following embodiments are merely examples and are not seen to be limiting.

First Embodiment

Figure 1:
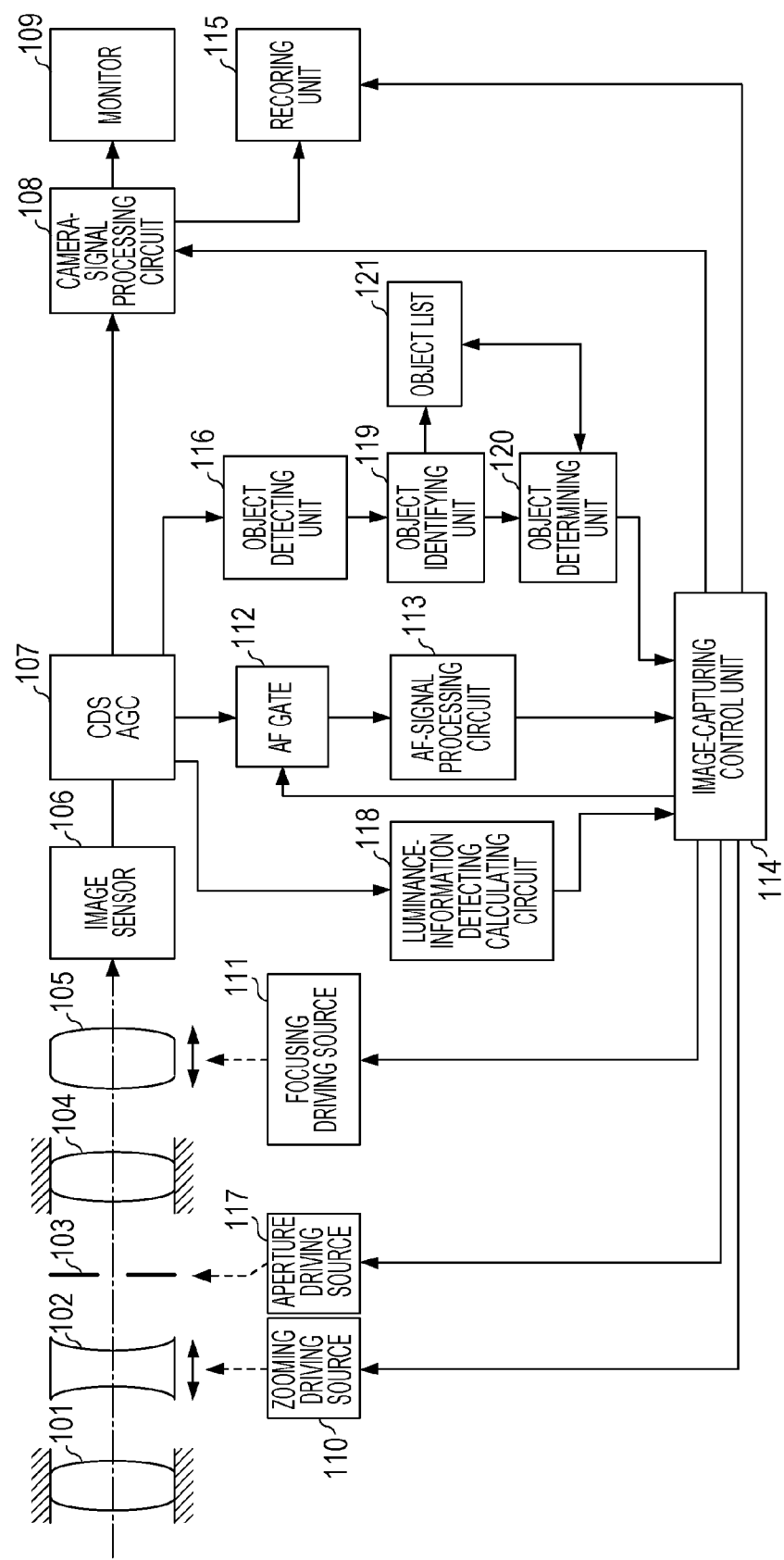
FIG. 1 is a block diagram illustrating the configuration of an image capturing apparatus according to a first embodiment.

FIG. 1 is a block diagram illustrating the configuration of an image capturing apparatus including an object detecting apparatus according to a first embodiment. In FIG. 1, a first fixed lens 101, a magnification varying lens 102, an aperture 103, a second fixed lens 104, and a focus compensator lens (focusing lens) 105 constitute an imaging optical system for focusing light coming from an object. The magnification varying lens 102 varies magnification by moving in an optical axis direction. The focusing lens 105 corrects the movement of a focal plane caused by scaling and performs focusing by moving in the optical axis direction. The imaging optical system of this embodiment is a super-wide-angle zoom lens (a so-called fisheye zoom lens) having large distortion.

An image sensor 106 is a photoelectric-conversion element, such as a CCD sensor or a CMOS sensor. The image sensor 106 photoelectrically converts an object image to generate an image signal. A correlated double sampling (CDS)/automatic gain control (AGC) circuit 107 samples the image signal output from the image sensor 106 and adjusts the gain. A camera-signal processing circuit 108 serving as an image generating unit performs various kinds of image processing on the signal output from the CDS/AGC circuit 107 to generate a video signal. A monitor 109 is an LCD or the like and displays the video signal generated by the camera-signal processing circuit 108. A recording unit 115 records the video signal generated by the camera-signal processing circuit 108 on a recording medium, such as a magnetic tape, an optical disc, or a semiconductor memory.

A zooming driving source 110 moves the magnification varying lens 102 in accordance with an instruction from the image-capturing control unit 114. A focusing driving source 111 moves the focusing lens 105 in accordance with an instruction from the image-capturing control unit 114. The zooming driving source 110 and the focusing driving source 111 are actuators, such as stepping motors, DC motors, vibration type motors, or voice coil motors.

An AF gate 112 allows only signals in an area (a focus detection area) for use in focus detection among signals of all pixels output from the CDS/AGC circuit 107 to pass through. An AF-signal processing circuit 113 extracts a high frequency component from the signals that have passed through the AF gate 112 to generate an AF evaluation value (focus signal). The AF evaluation value is output to the image-capturing control unit 114 serving as a control unit. The AF evaluation value indicates the degree of sharpness (the state of contrast) of an image generated on the basis of the image signal. Since the degree of sharpness changes depending on the focus state (the state of in-focus) of the imaging optical system, the AF evaluation value indicates the focus state of the imaging optical system. The image-capturing control unit 114 serving as the control unit controls the overall operation of the image capturing apparatus and focus adjustment by controlling the focusing driving source 111 on the basis of the AF evaluation value to drive the focusing lens 105.

The image capturing apparatus of this embodiment has a wide mode (a first mode) and a close-up mode (a second mode) as modes for capturing an image (live view capturing or video recording) in a state in which a video signal is displayed on the monitor 109. In this embodiment, an image distorted more with decreasing distance from the periphery is output by capturing an image of an object with the image sensor 106 via a fisheye lens. In the wide mode, the distorted image is displayed as it is on the monitor 109 and recorded. In the close-up mode, a central area clipped from the output distorted image is displayed on the monitor 109 and recorded. Thus, the angle of view of the image displayed in the close-up mode is closer to the telephoto direction than the angle of view of the image displayed in the wide mode. In the close-up mode of this embodiment, an image in which the central area is clipped from the distorted image and whose distortion (distorted aberration) is corrected by the camera-signal processing circuit 108 is displayed and recorded.

An object detecting unit 116 of this embodiment is a detection block for face detection or human body detection. The object detecting unit 116 performs a known detection process on the image signal output from the CDS/AGC circuit 107 to detect a specific object area in an imaging screen. In other words, the object detecting unit 116 constitutes an object detecting unit for detecting a predetermined object from the image signal. The detection result is transmitted to the image-capturing control unit 114 via an object identifying unit 119 and an object determining unit 120. The image-capturing control unit 114 transmits information to the AF gate 112 so that a focus detection area is set at a position including the object area in the imaging screen on the basis of the detection result.

In this embodiment, the process of detecting a specific object area will be described using a face detection process as an example. Examples of a method for the face detection process include a method of detecting a face by extracting a skin-colored area from the gradation colors of pixels expressed as image data and detecting a face from the degree of matching of the skin-colored area and a face contour plate prepared in advance and a method of detecting a face by extracting the features of a face, such as eyes, a nose, and a mouth using a known pattern recognition technique. Although this embodiment is described for the case in which the face detection process is performed for each frame, the process may be performed for each of a plurality of frames.

Another example of the process of detecting a specific object area is a human-body detecting process in addition to the face detecting process. In the human-body detecting process, the upper half of a human body (an area including the face and the body) is detected as a target object area from an image. If a plurality of persons are present in the image, areas corresponding to the persons are detected. An example of a method for detecting a human body is disclosed in Japanese Patent Laid-Open No. 2009-211311. In this example, the edge intensity of the contour of a local upper half of the body is measured as a local feature amount. Examples of a method for extracting the feature amount from an image include Sobel filtering, Prewitt filtering, and Haar filtering. The extracted local feature amount is used to determine whether or not the area is the upper half of the body with a person determiner. The determination with the person determiner is executed on the basis of mechanical learning, such as AdaBoost learning.

A partial area corresponding to a face detected area is presumed from the human-body detection result by the image-capturing control unit 114. In other words, a face area is presumed on the basis of the result of detection of the upper half of a human body (hereinafter referred to as a human body area). An example of a method for presumption uses linear transformation based on the relationship between a face area and a human body area. In other words, an area of a human body area defined by a predetermined position or (and) size is presumed as a face area.

Examples of information on an object area that the object detecting unit 116 outputs as a detection result include the positions, sizes, orientations (roll/pitch/yaw), and the degree of reliability of object areas corresponding to the number of detected persons. The degree of reliability is a value indicating the degree of likelihood of the object detection result and is determined in the process of detection.

The degree of reliability can be calculated by various methods. An example is a method of comparing the features of an object image stored in advance and the features of an image of an object area detected by the object detecting unit 116 to obtain the probability that the image of the object area detected is an image of the object and calculating the degree of reliability from the probability. Another example is a method of calculating the difference between the features of an object image stored in advance and the features of an image of the object area detected by the object detecting unit 116 and calculating the degree of reliability from the difference. In both calculating methods, a high degree of reliability indicates a low probability of false detection, and a low degree of reliability indicates a high probability of false detection.

Next, an object determining unit will be described. The information on the object area, which is the detection result of the object detecting unit 116, is sent to the object identifying unit 119. The object identifying unit 119 specifies an identical object from the chronologically continuous object detection results, sends the object information to the object determining unit 120, and stores the object information in an object list 121. The object determining unit 120 determines that a reliable object area is an object on the basis of the information on the object, detected in the past, stored in the object list 121. The information on the detection results determined as an object (the position, size, and so on of the object area in the captured image) is supplied to the AF gate 112 and the camera-signal processing circuit 108. The information on the detection results can be used to control image capturing conditions, such as control of auto focus detection and control of automatic exposure using the information on the object area. The details of the process of identifying an object and the process of determination on the object will be described later.

Although the following description shows only a human face as an example of a target object, the target object is not limited to the human face but may include an animal face or any other objects.

An aperture driving source 117 includes an actuator for driving the aperture 103 and a driver for the actuator. A luminance-information detecting calculating circuit 118 obtains the luminance value (photometric value) of a photometry frame in the screen from the signal read by the CDS/AGC circuit 107 and normalizes the value by calculation. The image-capturing control unit 114 calculates the difference between the photometric value obtained and normalized by the luminance-information detecting calculating circuit 118 and a target value set so that appropriate exposure can be obtained. The image-capturing control unit 114 calculates a driving amount for correcting an aperture value from the calculated difference and controls the driving of the aperture driving source 117.

Object Identifying Process

The object identifying unit 119 is given the information on the face area (the position and size of the face area in the captured image, the degree of reliability, and so on) as a face detection result from the object detecting unit 116. The object detecting unit 116 performs a face detection process without holding or using past face detection results. In contrast, the object identifying unit 119 holds the face detection results of the object detecting unit 116 in time sequence and specifies the face area of an identical object on the basis of the time-series face detection results. This allows object tracking.

Figure 2A:
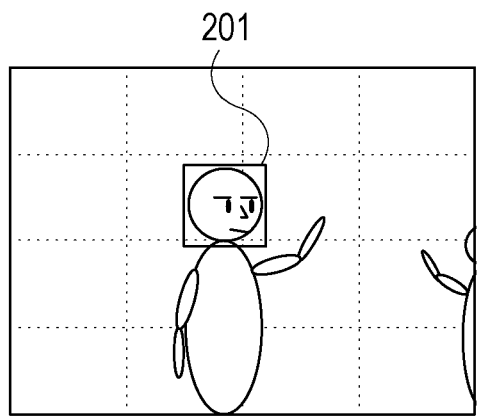
FIG. 2A is a diagram illustrating a process for identifying an identical object using the position and size of a face area with the image capturing apparatus according to the first embodiment.
Figure 2B:
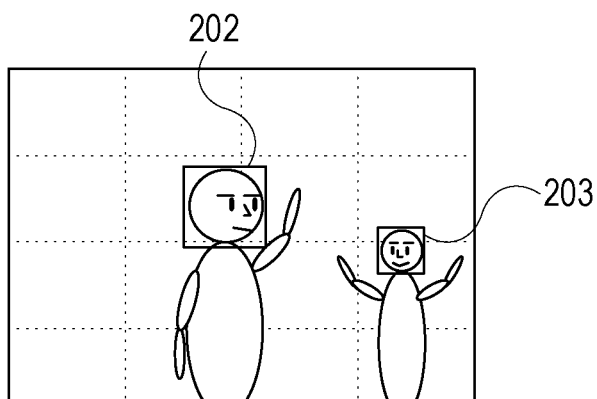
FIG. 2B is a diagram illustrating the process for identifying an identical object using the position and size of a face area with the image capturing apparatus according to the first embodiment.

The process of identifying an identical object using the position and size of a face area will be described with reference to FIGS. 2A and 2B. FIGS. 2A and 2B show two continuous time-series frames taken one by one, in which FIG. 2B illustrates a captured image at time t, and FIG. 2A illustrates an image at time t−1 one frame preceding the image in FIG. 2B. Although the face detection is performed for each frame, the face detection may be performed every several frames. Face areas detected in the individual frames by the object detecting unit 116 are illustrated in face frames 201, 202, and 203 in the drawings.

The position of a face area detected in the frame at time t−1 shown in FIG. 2A is expressed as $(x_{t-1}(i), y_{t-1}(i))$, and the size is expressed as $s_{t-1}(i)$ using the coordinates in the image. The position of the face area is indicated by the coordinates of the central position of the face area, for example. The position of a new face area detected in the frame at time t shown in FIG. 2B is expressed as $(x_t(j), y_t(j))$, and the size is expressed as $s_t(j)$, where i and j are integers that take on values from 1 to n, which are assigned to individual face areas detected in the same frame. The value n is the total number of detected face areas.

The object identifying unit 119 determines whether or not face areas to be compared with each other are of an identical object on the basis of the positions and sizes of the detected face areas in the time-series detection results. In an example of a method for the determination, if the target face areas have the same size, an area adjacent to an area having the same size as that of the face area detected in the frame at time t−1 is set around the face area detected in the frame at time t−1. If the adjacent area includes the face area detected in the frame at time t, the object identifying unit 119 determines that the areas are the face area of the identical object. In the case where the face areas to be compared with each other have different sizes, if the differences in the x-coordinate and the y-coordinate between the two face areas are included in an adjacent range set with reference to a smaller one of the target faces, the object identifying unit 119 determines that the face areas are of an identical object.

In other words, in this embodiment, the object identifying unit 119 determines that face areas in which the value obtained by Exp. 1 is 0 or greater are of an identical object.

$$\text{Min}(s_t(i), s_{t-1}(j)) - \text{abs}(x_t(i) - x_{t-1}(j)) - \text{abs}(y_t(i) - y_{t-1}(j)) \quad \text{(Exp. 1)}$$

If a plurality of face areas in which the value of Exp. 1 in the frame at time t−1 is 0 or greater are detected with reference to the face area detected in the frame at time t, a face whose value of Exp. 1 is the smallest is determined to be the area of the same object. If a face whose value of Exp. 1 is 0 or greater is not obtained in the frame at time t−1 with reference to the face detection result of the frame at time t, an object corresponding to the face detection result of the frame at time t is regarded as a new object. For example, in FIGS. 2A and 2B, the area of the frame 201 at time t−1 and the area of the frame 202 at time t are determined to be the same object, and the area of the frame 203 at time t is determined to be a new object.

The method for identifying an object described above is illustrative only, and another method may be used to identify an identical object. For example, it is possible to obtain information on the inclination and orientation of the face from the object detecting unit 116 and to use the information as conditions for identifying an object with the object identifying unit 119. It is also possible to obtain information on the image capturing apparatus, such as zoom magnification (focal length), the moving distance of the image capturing apparatus and ON/OFF of camera shake correction, and to use the information as conditions for identifying an object.

The object identifying unit 119 stores an object list 121, as shown in FIG. 3, and updates the object list 121 every time it receives a detection result from the object detecting unit 116. The object list 121 contains information on the position coordinates and sizes of individual face areas, the angles of faces, and the history of the degrees of reliability of the individual face areas, the details of which will be described later.

Object Determination Process

The object determining unit 120 determines information that can be effectively used by the image-capturing control unit 114 on the basis of face detection results output from the object detecting unit 116 and sends the information to the image-capturing control unit 114. In other words, the object determining unit 120 extracts a reliable detection result from the face detection results output from the object detecting unit 116 and sends the detection result to the image-capturing control unit 114. Specifically, the object determining unit 120 stores in advance a threshold value of the degree of reliability, described later, and a determination criterion for the number of detection times or detection duration as valid determination information on face detection results. The object determining unit 120 determines whether a face area that is determined to be the face area of an object detected in the preceding detection by the object identifying unit 119 is a reliable face area. In this embodiment, the object determining unit 120 determines a face area whose degree of reliability is greater than or equal to the threshold value and the number of detection times or detection duration has reached the determination criterion to be a reliable face area.

The degree of reliability may be either the value of the degree of reliability sent from the object detecting unit 116 or a value obtained by processing, for example, normalizing, the degree of reliability obtained from the object detecting unit 11. In this embodiment, the object determining unit 120 determines a face area that satisfies the above determination criterion from the history of the degree of reliability with reference to the object list 121, as shown in FIG. 3, that the object identifying unit 119 stores and manages as a face. The object determining unit 120 reads information on the position and size of the face area determined to be a face from the object list 121 and sends the information to the image-capturing control unit 114.

Figure 4A:
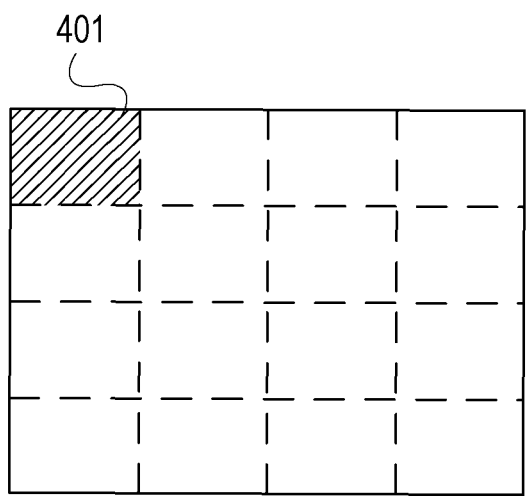
FIG. 4A is a diagram for explaining a lens having a distorted aberration characteristic of the image capturing apparatus according to the first embodiment.

Next, the operation of the image capturing apparatus according to the first embodiment will be described. The image capturing apparatus according to this embodiment includes a fisheye lens, which is a super wide-angle lens, as a lens group including the first fixed lens 101 to the focusing lens 105 in FIG. 1. When an image of a lattice pattern, as shown in FIG. 4A, is captured with the fisheye lens, image data in which a central portion of the screen is enlarged and a peripheral portion is reduced, as shown in 4B, is output from the image sensor 106. In this case, a hatched area 401 in FIG. 4A corresponds to a hatched area 402 in FIG. 4B.

Figure 4B:
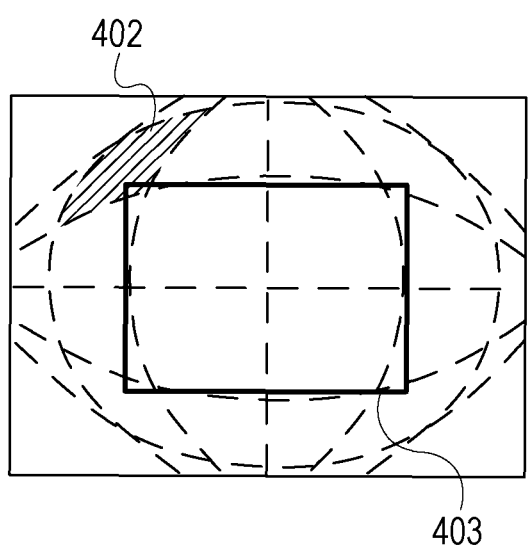
FIG. 4B is a diagram for explaining the lens having a distorted aberration characteristic of the image capturing apparatus according to the first embodiment.

The angle of view shown in FIG. 4B is the angle of view of an image captured in the wide mode in this embodiment and displayed and recorded. In contrast, in the close-up mode, an image of a clipped central portion of the image captured in the wide mode is displayed and recorded, as expressed as an area 403.

If an object is detected from image data obtained with a lens having large distortion, as in the wide mode of this embodiment, the object is significantly distorted in the peripheral portion, decreasing the reliability of the detection. Problems and solutions therefor will now be described with reference to FIGS. 5A to 5C and FIGS. 6A to 6C.

Figure 5A:
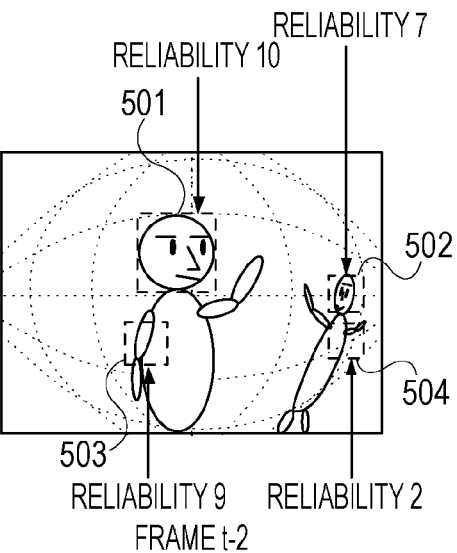
FIG. 5A is a diagram illustrating an example of face areas detected by an object detecting unit of the image capturing apparatus according to the first embodiment and corresponding degrees of reliability.
Figure 5B:
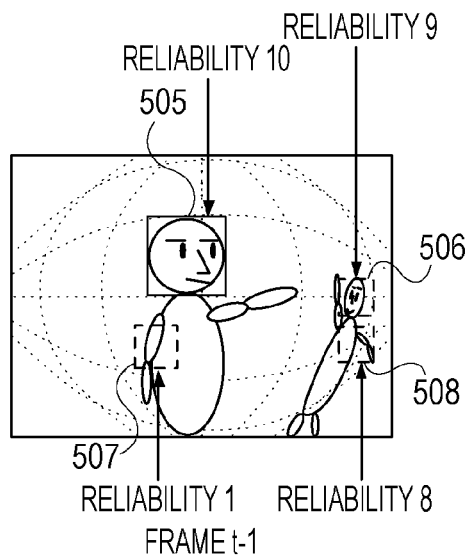
FIG. 5B is a diagram illustrating an example of face areas detected by the object detecting unit of the image capturing apparatus according to the first embodiment and corresponding degrees of reliability.
Figure 5C:
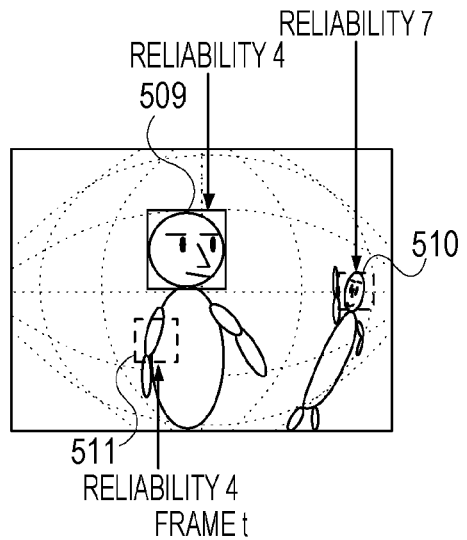
FIG. 5C is a diagram illustrating an example of face areas detected by the object detecting unit of the image capturing apparatus according to the first embodiment and corresponding degrees of reliability.

FIGS. 5A to 5C show face areas detected by the object detecting unit 116 and corresponding degrees of reliability. Assume that the degree of reliability has ten levels from 1 to 10 and that 10 indicates the highest likelihood of a face. Although FIGS. 5A to 5C show three continuous frames, the face detection process may be performed every several frames.

In the example shown in FIGS. 5A to 5C, many of face areas in which faces are correctly detected (areas 501, 502, 505, 506, 509, and 510) have high degrees of reliability, and many of areas in which portions other than the faces (areas 503, 504, 507, 508, 511) are falsely detected have lower degrees of reliability. However, some of the correctly detected face areas have lower degrees of reliability (the area 509), and some of the falsely detected areas have higher degrees of reliability (the areas 503 and 508).

Thus, the object identifying unit 119 tracks the degree of reliability of the detected areas of an identical object over time, and the object determining unit 120 determines whether the individual detected areas satisfy a predetermined determination criterion, that is, whether they are true face areas. In FIGS. 5A to 5C, the object determining unit 120 performs face determination over the entire area of the screen using a common determination criterion. Assume that the area indicated by a solid-line frame is an area determined to be a face by the object determining unit 120, and the area indicated by a dotted-line frame is an area that is not determined to be a face by the object determining unit 120. Assume that a threshold value of the degree of reliability is 8 and that a determination criterion that if degrees of reliability greater than or equal to 8 are detected two consecutive times, the area is determined to be a face, and otherwise, the area is not determined to be a face. An area that is once determined to be a face and is determined to be the same object in the next frame is continuously determined to be a face if given a degree of reliability greater than or equal to a threshold value of 4. In other words, the determination criterion for an area determined to be a face is relaxed by decreasing the threshold value of the degree of reliability in consideration of the stability of face detection and display of the face frame.

First, face detection is started with a frame at time t−2 (hereinafter referred to as a frame t−2) (FIG. 5A). As shown in FIG. 5A, the faces in the areas 501 and 502 are correctly detected, and the areas 503 and 504 are falsely detected. However, at this point in time, there is no area where a degree of reliability greater than or equal to the threshold value is given two consecutive times. Thus, the above determination criterion is not satisfied. Accordingly, the areas 501 to 504 are not determined to be faces.

In the next frame at time t−1 (hereinafter referred to as a frame t−1) (FIG. 5B), the area 505 is determined to be the same object as that in the area 501 of the frame t−2. Since the area 505 is given a degree of reliability of 10 continuously from the area 501 in the frame t−2, the area 505 is determined to be a face. In contrast, the falsely detected area 507 is determined to be the same object as that in the area 503 of the frame t−2. Although the area 503 has a degree of reliability of 9, the degree of reliability of the area 507 in the frame t−1 has decreased to 1, and thus the area 507 is not determined to be a face. The area 506 is determined to be the same object as that in the area 502 of the frame t−2. The areas 502 and 506 are actually face areas determined to be a face, but the degree of reliability of the area 502 is 7, and thus the areas 502 and 506 are not determined to be a face at time t−1. The falsely detected area 508 is determined to the same object as that in the area 504 of the frame t−2. The area 508 has a degree of reliability of 8, but the degree of reliability of the area 504 was 2, so that the area 508 is not determined to be a face.

In the next frame at time t (hereinafter referred to as a frame t (FIG. 5C), the area 509 is determined to be the same object as that in the area 505 of the frame t−1. Although the degree of reliability of the area 509 has decreased to 4, the area 509 has already been determined to be a face, so that the area 509 is determined to be a face at this point in time. The falsely detected area 511 is determined to be the same object as that in the area 507 of the frame t−1. Since the degree of reliability of the area 511 is 4, the area 511 remains not determined to be a face. The area 510 is determined to be the same object as that in the area 506 of the frame t−1. Although the degree of reliability of the area 506 is 9, it has decreased to 7 in the frame t, so that the area 510 is not determined to be a face. For the area 504 and the area 508 falsely detected in the frames t−2 and frame t−1, respectively, there is no area determined to be the same object in the frame t.

As described above, in FIGS. 5A to 5C, the falsely detected areas 503, 504, 507, 508, and 511 are not determined to be a face, thus reducing false detection. In particular, even for an area given a high degree of reliability, although falsely detected like the areas 503 and 508, false face determination and display of a face frame can be reduced. In contrast, for the areas 506 and 510 to be determined to be face areas, it is difficult to output reliable detection results due the distortion of the peripheral portion of the screen, thus making it difficult to determine that the areas are faces.

In this embodiment, changing the determination criterion depending on the position of the detected area in the screen enable more reliable face determination even if a reliable face detection result cannot be obtained due to distortion. Specifically, in the wide mode, a determination criterion is set depending on the distance from the center of the screen. Examples of the determination criterion may include the following criteria (1) to (3) or a combination thereof.

(1) The closer to the center of the screen, the higher the threshold value of the degree of reliability of face determination is set, and the closer to the peripheral portion of the screen, the lower the threshold value is set. (2) If the angle (roll/pitch/yaw) of the detected face is within a predetermined angle range, the area is determined to be a face. The closer to the center of the screen, the smaller an angle range for face determination is set, and the closer to the peripheral portion of the screen, the larger the angle range is set. (3) In addition to the criterion (1), a threshold value of the number of detection times (or detection duration) in which a degree of reliability greater than or equal to a threshold value is detected (or continuously detected). Specifically, the closer to the center of the screen, the smaller (or shorter) the threshold value of the number of detection times (or detection duration) is set, and the closer to the peripheral portion of the screen, the larger (or longer) the threshold value is set. The tracking and recording of the degree of reliability of each face area is performed by the object identifying unit 119, and the determination based on a determination criterion is performed by the object determining unit 120.

Figures 7A, 7B:
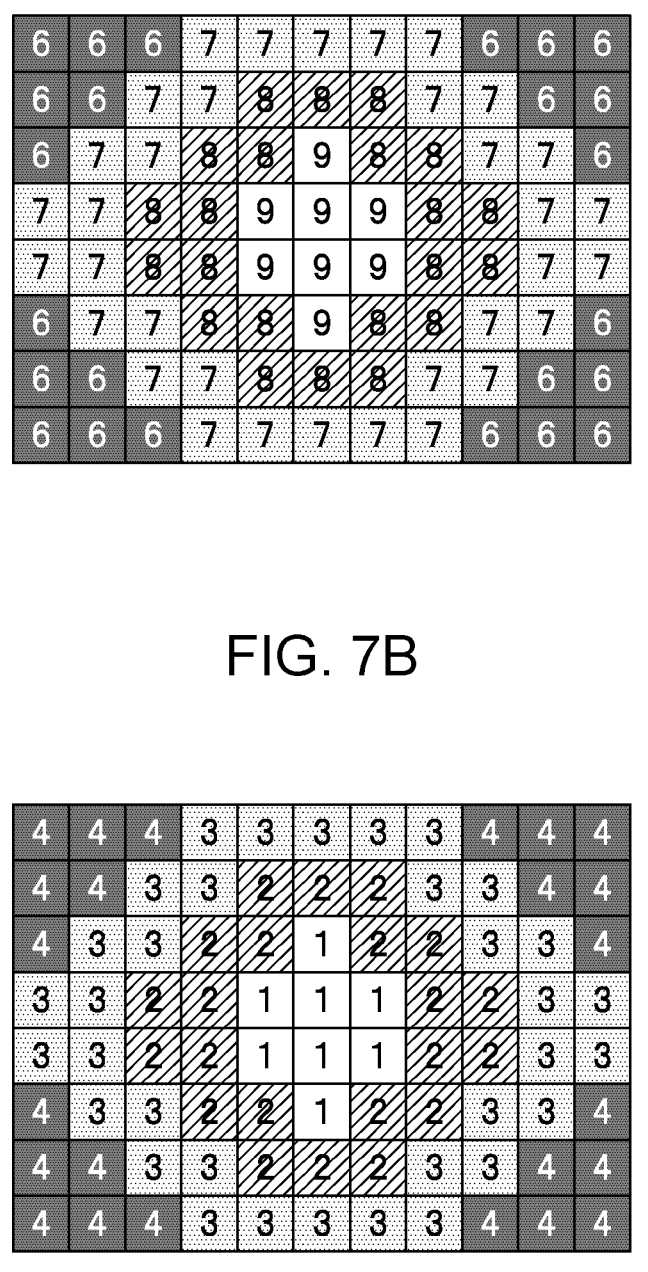

First, determination criteria shown in FIGS. 7A and 7B will be described. In FIGS. 7A and 7B, a video signal is divided into 11-by-8 areas, and determination criteria are set to the divided areas. In FIG. 7A, threshold values of the degrees of reliability of detected face areas are set to the individual areas. For example, for the central areas with small distortion, the object determining unit 120 increases the number of detection times when the degree of reliability of an area the object detecting unit 116 outputs is greater than or equal to 9 and records the number on the object list 121. For peripheral areas with large distortion (for example, the upper left), the object determining unit 120 increases the number of detection times of face areas whose degrees of reliability, among face areas that the object detecting unit 116 outputs, are greater than or equal to 6, and records the number on the object list 121.

If the determination criterion (1) is used, face determination on areas that the object detecting unit 116 outputs is performed on the basis of the threshold values of the degree of reliability set depending on the amount of distortion, as shown in FIG. 7A. This advantageously increases the detection rate of a face located in the peripheral portion of the screen but increases the probability of false detection.

A case where the determination criterion (3) is used to reduce false detection will now be described. If the determination criterion (3) is used, threshold values of the number of detection times in FIG. 7B are used for face determination in addition to the threshold values of the degree of reliability in FIG. 7A.

In FIG. 7B, threshold values (threshold values for the number of detection times (or (detection duration) in which degrees of reliability greater than or equal to the threshold values set for the individual areas in FIG. 7A are set. In other words, in an area in which a target determination area is present, when the number of detection times in which a degree of reliability greater than or equal to the value shown in FIG. 7A reaches the number shown in FIG. 7B, the area is determined to be a face by the object determining unit 120. Assume that the target determination area is present in the center of the image. If a degree of reliability greater than or equal to 9 is detected once, the area is determined to be a face. Assume that the target determination area is present in the peripheral portion (for example, the upper left) of the image. If the degree of reliability greater than or equal to 6 is detected four times, the area is determined to be a face.

Figure 6A:
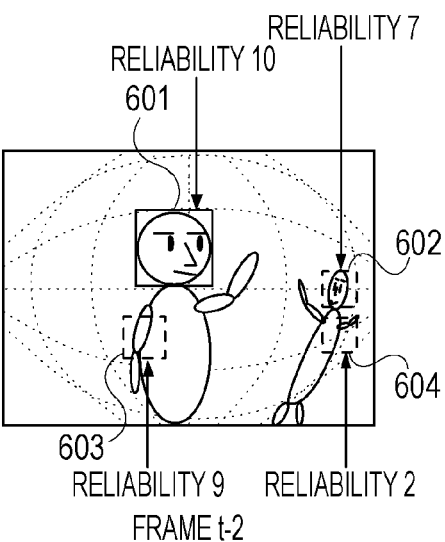
FIG. 6A is a diagram of an example in which a determination criterion in the first embodiment is applied to the image shown in FIG. 5A.
Figure 6B:
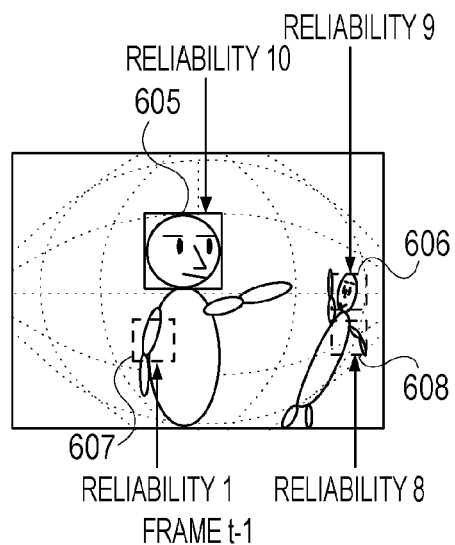
FIG. 6B is a diagram of an example in which the determination criterion in the first embodiment is applied to the image shown in FIG. 5B.
Figure 6C:
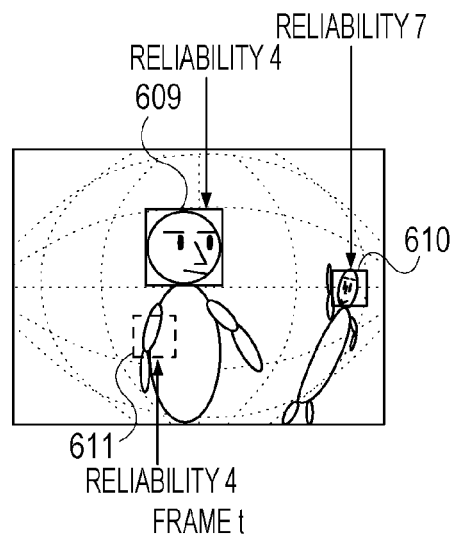
FIG. 6C is a diagram of an example in which the determination criterion in the first embodiment is applied to the image shown in FIG. 5C.

An example in which the threshold values shown in FIGS. 7A and 7B are applied, that is, the determination criterion (3) is applied, will next be described with reference to FIGS. 6A to 6C. FIGS. 6A to 6C show three continuous frames, as in FIGS. 5A to 5C. Also in FIGS. 6A to 6C, the area indicated by a solid-line frame is an area determined to be a face by the object determining unit 120, and the area indicated by a dotted-line frame is an area that is not determined to be a face by the object determining unit 120. Areas determined to be faces may be given an indication that the area is a face (for example, a face frame) to allow users to view the areas, whereas areas that are not determined to be faces may be given an indication different from that for areas determined to be faces or may be given no indication.

Also in FIGS. 6A to 6C, for an area that is once determined to be a face and is determined to be the same object in the next frame, the threshold value of the degree of reliability is decreased to improve the reliability of face detection, as in FIGS. 5A to 5C. For example, in FIG. 7A, areas whose threshold values of the degree of reliability are 9, 8, 7, and 6 are determined to be faces provided that degrees of reliability of 5, 4, 3, and 2 or higher are given, respectively.

First, assume that face detection is started with the frame t−2 (FIG. 6A). At this point in time, an area 601 with a degree of reliability of 9 is detected. A determination criterion for the area 601 in FIG. 7A corresponds to "a degree of reliability of 9 or higher is detected one time". The area 601 satisfies the determination criterion and is determined to be a face. A determination criterion for an area 602 and an area 604 corresponds to "a degree of reliability of 7 or higher is detected three times". A determination criterion for an area 603 corresponds to "a degree of reliability of 8 or higher is detected twice". Thus, the areas 602 to 604 do not satisfy the determination criterions, so that they are not determined to be a face.

In the frame t−1 (FIG. 6B), an area 605 is determined to be the same object as that of the area 601 in the frame t−2. Since the area 601 has already been determined to be a face, and the area 605 is given a degree of reliability of 10, the area 605 is determined to be a face. Assume that an area 606 is determined to be the same object as that of the area 602 in the frame t−2. Since the degree of reliability of the area 602 is 7, and the degree of reliability of the area 606 is 9, the number of detection times of a threshold value of 7 or greater is two. Since the number is not greater than the threshold value of detection times, 3, at this point in time, the area 602 is not determined to be a face. Assume that an area 607 is determined to be the same object as that of the area 603 in the frame t−2. Since the degree of reliability of the area 603 is 9, the number of detection times of a threshold value of 8 or greater is one. However, the degree of reliability has decreased to 1 in the present frame t−1, so that this is not added to the number of detection times. Assume that an area 608 is determined to be the same object as that of the area 604 in the frame t−2. Although the degree of reliability of the area 608 is 8, the degree of reliability of the corresponding area 604 in the preceding frame t−2 is 2. Thus, the number of detection times of a threshold value of 7 or greater is one in the present frame t−1, so that the area 608 is not determined to be a face at this point in time.

Assume that an area 609 in the next frame t (FIG. 6C) is determined to be the same object as that of the area 605 in the frame t−1. Although the degree of reliability of the area 609 has decreased to 4, the area 609 is determined to be a face at this point in time because the area 605 has already been determined to be a face. Assume that an area 611 is determined to be the same object as that of the area 607 in the frame t−1. Since the degree of reliability of the area 611 is 4, and also the area 607 has not been determined to be a face, the area 611 is not yet determined to be a face. Assume that an area 610 is determined to be the same object as that of the area 608 in the frame t−1. For the area 610, the number of detection times of a degree of reliability greater than or equal to the threshold value by the preceding frame t−2 is two, and the degree of reliability in the frame t is greater than or equal to the threshold value of 7, so that the number of detection times of degrees of reliability greater than or equal to the threshold value is three. Thus, the area 610 is determined to be a face in the frame t. The areas 604 and 608 detected in the frame t−2 and the frame t−1, respectively, are not determined to be a face because there is no area determined to be the same object in the frame t. If there is no area determined to be the same object as that of an area detected in the preceding frame, the area may be deleted from the object list 121 at this point in time.

As described above, in determining whether an area detected by the object detecting unit 116 is a predetermined object (for example, a face), a threshold value for the determination is changed depending on the amount of distortion of the image. In the case of image capturing using a fisheye lens, the amount of distortion depends on the distance from the center of the image. Thus, the threshold value of the determination is changed depending on the distance from the center of the image. More specifically, the threshold value of the degree of reliability of a predetermined object is set lower with decreasing distance from the peripheral portion of the image where a larger amount of distortion occurs. Changing the threshold value of the degree of reliability allows a predetermined object to be detected in the peripheral portion of the image with more stability. Providing a threshold value of the number of detection times of a degree of reliability greater than or equal to a threshold value and setting a greater threshold value of the detection times to an area whose threshold value of the degree of reliability is lower, that is, an area with a larger amount of distortion enhance the detection accuracy of the predetermined object in an area with a large amount of distortion.

If the determination criterion (2) is used, the threshold values of the degree of reliability shown in FIG. 7A are replaced with threshold values of the angle (Roll/Pitch/Yaw) (threshold values of the detection angle) of a predetermined object (for example, a face). Specifically, threshold values of the detection angle are set so that the angle range for determining a predetermined object is set smaller with decreasing distance from the center of the screen and is set larger with decreasing distance from the peripheral portion of the screen. Also in this case, a predetermined object located in the peripheral portion of the image can be detected with more stability.

Figure 8:
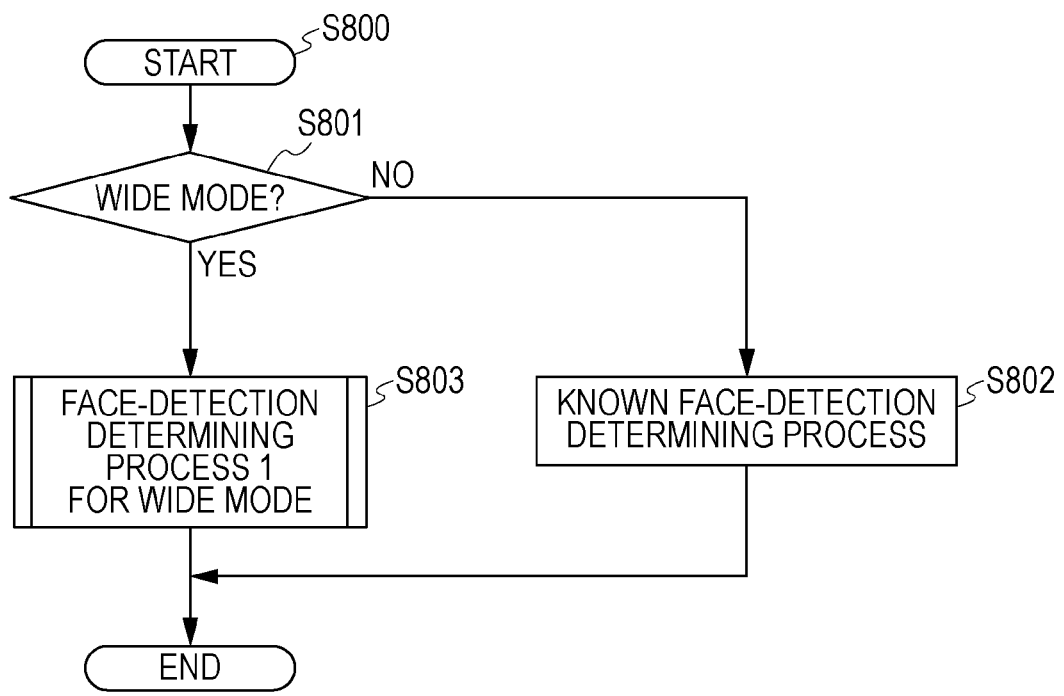
FIG. 8 is a flowchart showing the overall process of the image capturing apparatus according to the first embodiment.
Figure 9:
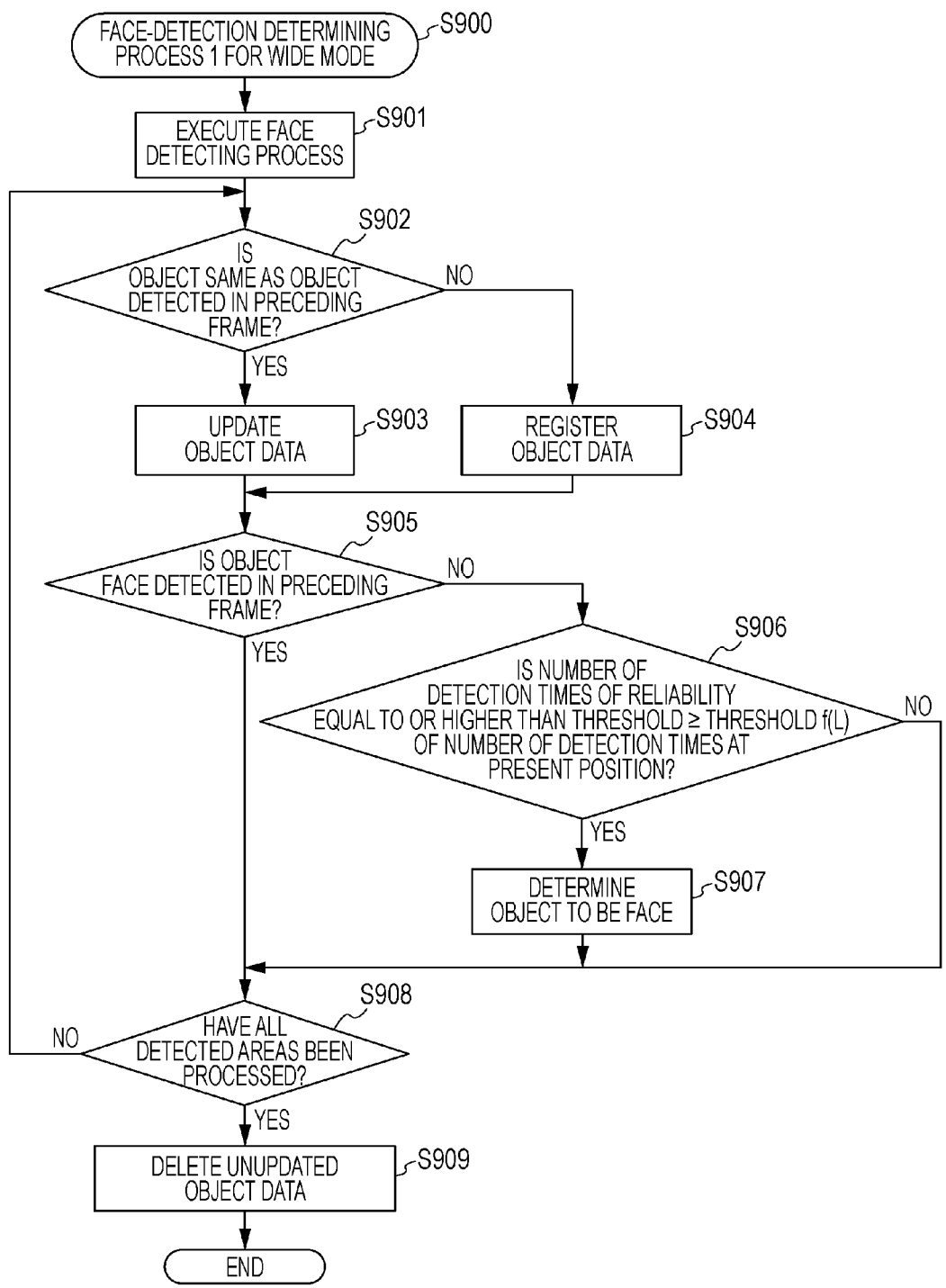
FIG. 9 is a flowchart showing a face detection determination process of the image capturing apparatus according to the first embodiment.

Next, the face detection determination process in the image capturing apparatus of this embodiment will be further described with reference to the flowcharts in FIG. 8 and FIG. 9. FIG. 8 is a flowchart showing the overall process. Step S800 shows the start of the process. In step S801, it is determined whether or not the wide mode has been set. If the wide mode has been set, the process goes to step S803. If the wide mode has not been set (in this embodiment, the close-up mode has been set), the process goes to step S802.

If the process goes to step S802, a known face detection determination process is performed. In this case, the threshold value of the degree of reliability for face determination and the threshold value of the number of detection times are set to common values irrespective of the position of the detected area in the image.

If the process goes to step S803, a face detection determination process 1 for the wide mode is executed. The details of the face detection determination process 1 for the wide mode will be described with reference to the flowchart in FIG. 9.

First, step S900 shows the start of the process. In step S901, the object detecting unit 116 detects human faces from an image and obtains the positions (coordinates), degrees of reliability, angles (Roll/Pitch/Yaw) of the individual detected areas. In this embodiment, the object detecting unit 116 performs face detection for individual images continuously obtained in time series.

Next, in step S902, the object identifying unit 119 compares the detection result of one of the areas detected in the present frame in step S901 with the detection result in the preceding frame by the method for identifying an object, described above, to determine whether the area detected in step S901 is the same object as that detected in the preceding frame. If it is determined that the detection result of the present frame is the same as that in the preceding frame, the process goes to step S903, and if not, the process goes to step S904.

In step S903, the object identifying unit 119 updates the data registered in the object list 121 on an area in the present frame determined to be the same object as that of the area detected in the preceding frame. The object identifying unit 119 rewrites the position, size, and angle of the face area in the data registered in the object list 121 to the detection result in the present frame for update.

The update of the number of detection times of the degree of reliability will be described with reference to the object list 121 shown in FIG. 3. In the object list 121 in FIG. 3, the number of detection times of the degree of reliability detected in the present frame and the number of detection times of degrees of reliability lower than that are counted, and all the numbers of detection times of degrees of reliability higher than that detected in the present frame are updated to 0. For example, if the degree of reliability detected in the present frame is 10, the numbers of detection times of all the degrees of reliability are counted. If the degree of reliability detected in the present frame is 6, the numbers of detection times of degrees of reliability of 1 to 6 are counted, and the numbers of detection times of degrees of reliability of 7 to 10 are set to 0. This update method allows the numbers of continuous detection times of degrees of reliability to be recorded, allowing whether the numbers of continuous detection times of degrees of reliability greater than or equal to a threshold value have reached a threshold value of the number of detection times.

The method for counting the numbers of detection times of degrees of reliability greater than or equal to a threshold value and the method for updating the data are given for illustration and are not seen to be limiting. It will be appreciated that degrees of reliability greater than or equal to a threshold value are continuously detected in the point of view of the accuracy of face determination but may not necessarily be continuously detected. For example, in FIG. 7A, if a degree of reliability greater than or equal to a threshold value is detected in an area with the same threshold value, the number of detection times is counted, and if the degree of reliability is less than the threshold value, the number of detection need not be changed.

In step S904, the object identifying unit 119 gives a new object ID to an area, of areas detected in the present frame, determined to be a different object from the area detected in the preceding frame, and registers the area as new object data with the object list 121.

In step S903 or S904, the object identifying unit 119 updates or registers the data in the object list 121 in FIG. 3 on the basis of information on the position, size, angle, and the degree of reliability of the face area given from the object detecting unit 116 and the identification result of an object. In the object list 121, the position, size, angle, the number of detection times of each of degrees of reliability of the object (face area), a face determination flag indicating whether or not the object is determined to be a face, and an update flag indicating that the object is registered or updated are associated with an object ID for identifying the object. The update flag is cleared to 0 frame by frame and is updated to 1 when the object data is updated in step S903 or registered in step S904.

In operation in an initial frame, the object list 121 contains no data. Thus, the object identifying unit 119 registers all items of information on detected face areas with the object list 121 as new object data. In the following frames, the object identifying unit 119 performs an object determination process using the object data in the object list 121 and the information on the detection result of the present frame.

The object determining unit 120 determines a face area (an area with a high probability of a face) of the areas of the objects on the basis of the history of the degrees of reliability of the face areas of the objects recorded in the object list 121, specifically, the numbers of detection times or detection duration depending on the degrees of reliability.

An object determined to be a face by the object determining unit 120 may be determined to be a face irrespective of the degree of reliability provided that an area identified as the same object is detected in the following process. As described above, an object determined to be a face by the object determining unit 120 may be detected with a threshold value of the degree of reliability in the subsequent detection result decreased from that in FIG. 7A. For example, face determination may be performed using the threshold values shown in FIG. 7A until the object is determined to be a face by the object determining unit 120, and after the object is determined to be a face, the threshold values of areas with threshold values of 9, 8, 7, and 6 may be decreased to 5, 4, 3, and 2, for example.

In step S905, the object determining unit 120 determines whether the area detected in the present frame has already been detected as a face. If the face determination flag in the object list 121 shown in FIG. 3 is 1, the object determining unit 120 determines that the object has already been determined to be a face, and the process goes to step S908. If the face determination flag is 0, the object determining unit 120 determines that the object has not been determined to be a face, and the process goes to step S906. The value of the face determination flag at the registration of object data is 0.

In step S906, the object determining unit 120 determines whether an area whose face determination flag is 0 satisfies a predetermined determination criterion with reference to the history of the degree of reliability in the object list 121 and the number of detection times. In other words, the object determining unit 120 determines whether the number of detection times of degrees of reliability greater than or equal to a threshold value in an area of the object is greater than or equal to a threshold value f(L) of the number of detection times of the area at the present position. If the number of detection times of degrees of reliability greater than or equal to a threshold value is greater than or equal to the threshold value f(L) of the number of detection times at the present position, the process goes to step S907, and if it is less than the threshold value f(L), the process goes to step S908.

In this embodiment, the determination criterion (3) is set by way of example. With the determination criterion (1), in step S906, if the degree of reliability of the detected area is greater than or equal to the threshold value of the area, the process goes to step S907, and if the degree of reliability is less than the threshold value, the process goes to step S908. With the determination criterion (2), in step S906, if the face detection angle of the detected area is smaller than the threshold value of the detection angle of the area, the process goes to step S907, and if the angle is larger than the threshold value of the detection angle, the process goes to step S908.

In this embodiment, as shown in FIG. 7A and FIG. 7B, threshold values of the degree of reliability and threshold values of the number of detection times for individual areas are set as determination criteria, and face determination is performed depending on whether the determination criteria are satisfied. In this embodiment, the threshold values are set on the basis of areas in which face areas are detected in the present frame. Selection of the areas may be performed with reference to the central coordinates of the areas detected in the present frame, or a threshold value averaged from the positions and sizes of the detected areas may be set.

In addition, in this embodiment, the threshold value of the degree of reliability and the threshold value of the number of the detection times change with distance from the center of the screen substantially linearly (the threshold value of the degree of reliability decreases, and the threshold value of the number of the detection times increases with decreasing distance from the peripheral portion of the screen); however, they may be in non-linear relationship.

In step S907, the object determining unit 120 determines an object whose degree of reliability satisfies the above criteria, of the face areas contained in the object list 121 shown in FIG. 3, to be a face and sets the value of the face determination flag in the object list 121 to 1. The object determining unit 120 reads information on the area determined to be a face from the object list 121 and sends the information to the image-capturing control unit 114.

In contrast, the object determining unit 120 does not determine a face area whose number of continuous detection times does not satisfy the reference value to be a face and leaves the face determination flag at 0. The object determining unit 120 does not send information on the face area that is not determined to be a face to the image-capturing control unit 114.

The process from step S902 to step S907, described above, is performed on the individual areas detected by the face detection in step S901. Thus, in step S908, the object determining unit 120 determines whether the process has been performed on all the areas detected in the present frame. If unprocessed detected areas remain in the present frame, the object determining unit 120 returns one of them to step S902 as a processing target. If all the areas detected in the present frame have been processed, the object determining unit 120 moves the process to step S909.

In step S909, if un-updated object data is present in the object list 121, the object determining unit 120 deletes it from the object list 121 because it is data on object that is detected in the preceding frame but is not detected in the present frame.

Thus, in the case where a specific object is to be detected from an image with a large amount of distortion, this embodiment sets a threshold value of the degree of reliability for determining the specific object depending on the amount of distortion, thereby enhancing the detection rate with a simple method. Furthermore, this embodiment performs determination from the number of detection times or the detection duration of degrees of reliability greater than or equal to a threshold value based on the history of the degree of reliability, thereby enhancing the detection accuracy with a simple method.

Although in this embodiment the screen is divided into 11-by-8 areas, any number of divided areas and any division ratio can be set. The screen may be divided into not only rectangular areas, such as squares and rectangles, but also areas including a curve depending on the characteristics of distorted aberration. The areas of threshold values of the degree of reliability and threshold values of the number of the detection times and the amount of change in the threshold values may not necessarily be the same as the above; the shapes and sizes of the areas and changes in the amount of change in the threshold values may differ.

Second Embodiment

Although the first embodiment shows a method for changing a threshold value depending on the amount of distortion when a predetermined object is to be detected from an image with a large amount of distortion, the process of the first embodiment may be performed only on an object that the image capturing apparatus is tracking. Specifically, if the image capturing apparatus is not tracking an object, a threshold value of the degree of reliability and a threshold value of the number of the detection times are provided for the entire image, as in the related art, and if the image capturing apparatus is tracking an object, the determination criterion on the periphery of the tracked object is changed.

Figure 10:
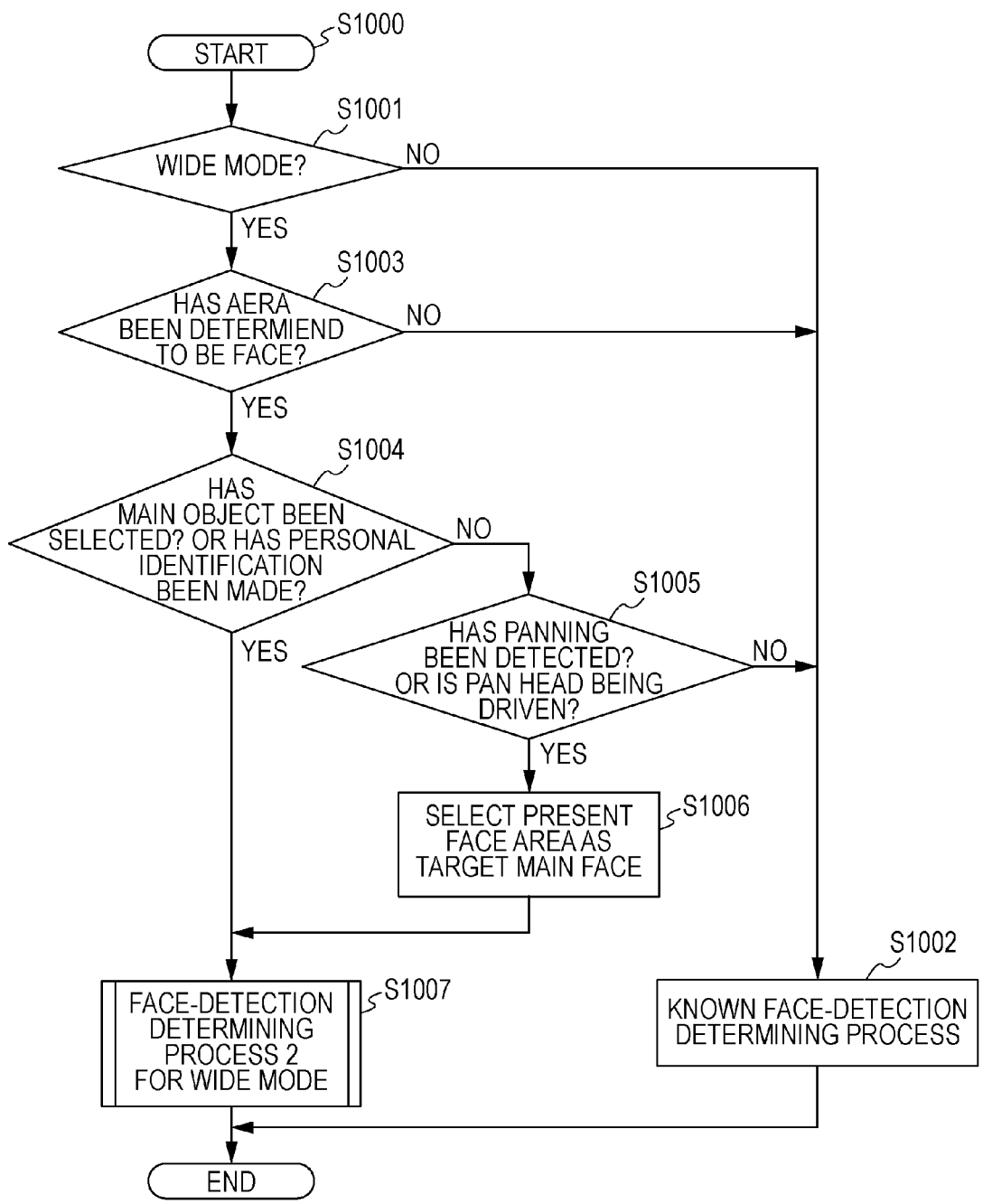
FIG. 10 is a flowchart showing the overall process of an image capturing apparatus according to a second embodiment.

The process of the second embodiment will now be described. FIG. 10 is a flowchart of the overall process of this embodiment.

Step S1000 shows the start of the process. First, in step S1001, it is determined whether or not the wide mode has been set. If the wide mode has been set, the process goes to step S1003. If the wide mode has not been set (in this embodiment, the close-up mode has been set), the process goes to step S1002.

If the process goes to step S1002, a known face detection determination process is performed. In this case, the threshold value of the degree of reliability for face determination and the threshold value of the number of detection times are set to common values irrespective of the position of the detected area in the image.

In step S1003, it is determined whether or not the area has already been determined to be a face. If an area determined to be a face is present, the process goes to step S1004, and if not, the process goes to step S1002.

Next, in step S1004, for the area determined to be a face, it is determined whether a main object (a main face) has been selected by a user, or whether personal identification has been made. The personal identification is made when a template of the main object is stored in a storage area of the image capturing apparatus, with which the object is identified as the object stored in the storage area by a known method. If it is determined that the main object is selected or identified, the image-capturing control unit 114 determines that the image capturing apparatus is tracking the main object, and the process goes to step S1007. If the main object is not selected and is not identified, the process goes to step S1005.

In step S1005, the image-capturing control unit 114 determines whether a panning operation is detected or whether the image capturing apparatus is attached to a pan head and is driven in accordance with an instruction from the user. If the panning operation is detected or the pan head is driven, the process goes to step S1006. In contrast, if no panning operation is detected and the pan head is not driven, it is determined that the image capturing apparatus is not tracking the object, and the process goes to step S1002, where the image-capturing control unit 114 makes a face determination using a known face determination criterion.

In step S1006, if the image-capturing control unit 114 has detected a panning operation, a detected area moving in the same direction as the detected panning direction is selected as a main face from detected areas determined to faces in the present frame. If the image capturing apparatus is attached to the pan head, and the direction is changed in accordance with an instruction from the user, a detected area moving in the same direction as the direction designated by an instruction from the user is selected as a main face. The face area selected as a main face is determined as a target to be tracked, and the process goes to step S1007.

Figure 11:
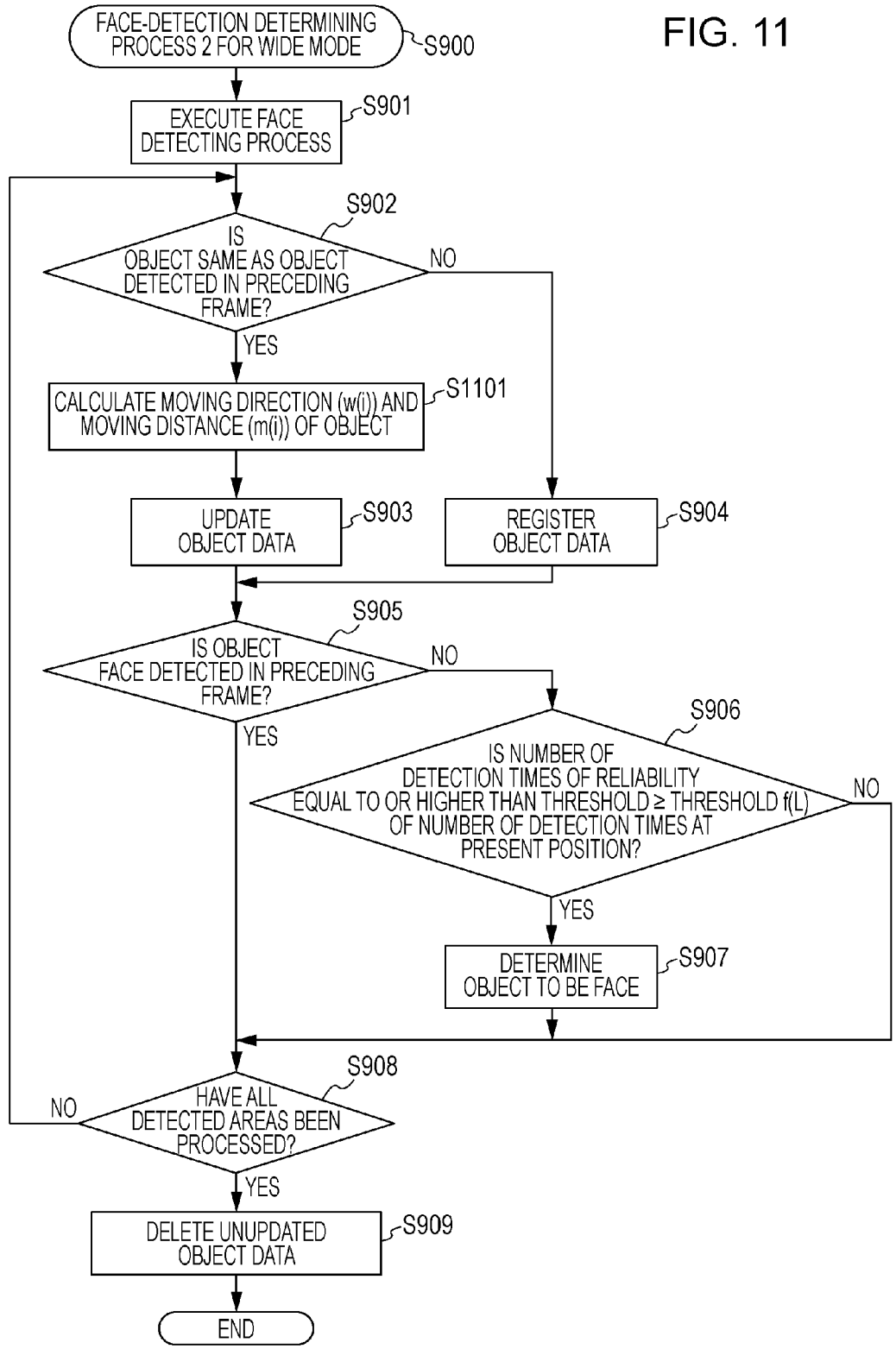
FIG. 11 is a flowchart showing a face detection determination process of the image capturing apparatus according to the second embodiment.

In step S1007, a face detection determination process 2 for a wide mode is executed. The details of the face detection determination process 2 for a wide mode will be described with reference to a flowchart in FIG. 11. The same processes as in the flowchart in FIG. 9 are given the same numerals, and descriptions thereof will be omitted.

First, a method for determining that an object is tracked by panning will be described. If an area that is determined to be the same object in the present frame and the preceding frame is detected, the object identifying unit 119 calculates the moving direction w(i) and the moving distance m(i) of the object from the difference in position between the areas of the objects determined to be the same object in step S1101. Not the moving distance between the two continuous frames but a cumulative value of the amounts of movement among a plurality of frames in a fixed period may be obtained, and the difference between continuously obtained cumulative values may be used as the moving distance. The use of the cumulative values can reduce significant changes in determination criterion even if the moving distance of the object is temporarily increased due to false determination on an identical object.

The process goes to step S903, and the object identifying unit 119 updates corresponding object data including the moving direction w(i) and the moving distance m(i) in the object list 121.

In contrast, if an area of an object that is not detected in the preceding frame is detected in the present frame, the object identifying unit 119 registers information of the detected area in the object list 121 as new object data in step S904. In registering new data, the moving direction is not registered, and a moving distance of 0 is registered.

FIG. 12 shows the object list 121 for use in the second embodiment. The object list 121 in this embodiment contains information on the moving direction w(i) and the moving distance m(i) in addition to the information in the object list 121 shown in FIG. 3.

The image capturing apparatus of this embodiment includes an acceleration sensor (not shown), so that the image-capturing control unit 114 can determine the moving direction of the image capturing apparatus from the output value of the acceleration sensor. The image-capturing control unit 114 selects a detected area that has moved in the same direction as the sensed panning direction from the object list 121 in FIG. 12 on the basis of the output value (moving direction information) of the acceleration sensor. Next, the image-capturing control unit 114 determines that a detected area whose difference in the moving distance between the present frame and the preceding frame is closest to zero is a tracked object. Alternatively, not the difference in the moving distance between the present frame and the preceding frame, as described above, but the smallest cumulative value of the amounts of movement in a fixed period may be used to determine a tracked object. The use of the cumulative value can reduce influences on false determination of an identical object and influences of hand shake.

Next, a method for determining that an object is tracked by driving a pan head will be described. This case also uses the object list 121 in FIG. 12 in which the moving direction and the moving distance are recorded.

The image capturing apparatus of this embodiment has a configuration for allowing the image capturing apparatus to be mounted on a pan head (not shown), in which the pan head can be moved vertically and horizontally in accordance with an instruction from the user. The pan head includes a supporting portion that supports the image capturing apparatus and that changes the optical axis direction of the image capturing apparatus, a drive control unit that controls the driving of the supporting portion, and an instruction transmitter that transmits a driving instruction to the supporting portion.

The image-capturing control unit 114 selects a detected area that has moved in the same direction as that indicated by instruction information from the user from the object list 121 in FIG. 12. Next, the image-capturing control unit 114 determines that a detected area whose moving distance is closest to 0 in the present frame is a tracked object. Alternatively, not the difference in the moving distance between the present frame and the preceding frame, as described above, but the smallest cumulative value of the amounts of movement in a fixed period may be used to determine a tracked object. The use of the cumulative value can reduce influences on false determination of an identical object.

As described above, setting a threshold value responsive to the amount of distortion only to an object determined to be a tracked object can enhance object tracking accuracy while further reducing false detection.

Although the exemplary embodiments show a case in which an image capturing apparatus including an optical system having a large distorted aberration has two image capturing modes (a wide mode and a close-up mode), any other image capturing apparatuses that detect a specific object from an image with a large distortion can be used. For example, in an image capturing apparatus capable of a zooming operation, whether to perform threshold value setting may be determined depending on whether the zooming is in a wide-angle direction or a telephoto direction with respect to a predetermined zoom magnification. Alternatively, in an image capturing apparatus of an exchangeable lens type, threshold value setting may be performed when a lens with a large distortion aberration is mounted.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiments, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-244244, filed Nov. 26, 2013, which is hereby incorporated by reference herein in its entirety.

What is claimed is:

1. An object detecting apparatus comprising:
   a processor; and
   a memory coupled to the processor storing instructions that, when executed by the processor, cause the processor to perform operations comprising:
   detecting an area of a predetermined object from an image;
   calculating an evaluation value on the area detected by the detecting; and
   determining, when the evaluation value satisfies a predetermined criterion, that the area is the predetermined object,
   wherein the predetermined criterion is set depending on an amount of distortion of the image.

2. The object detecting apparatus according to claim 1, further comprising:
   a first mode in which the predetermined criterion is changed depending on the amount of distortion of the image; and
   a second mode in which the predetermined criterion is not changed,
   wherein the second mode is set when an image with a distortion smaller than the distortion in the first mode is to be displayed on a display unit.

3. The object detecting apparatus according to claim 1, wherein
   the evaluation value indicates a degree of reliability of the predetermined object.

4. The object detecting apparatus according to claim 3, wherein
   a condition that satisfies the predetermined criterion includes that the degree of reliability greater than or equal to a first threshold value is detected.

5. The object detecting apparatus according to claim 4, wherein
   the first threshold value is set lower with increasing amount of distortion of an area in the image.

6. The object detecting apparatus according to claim 4, wherein
   the first threshold value set to a peripheral portion of the image is lower than the first threshold value set to a central portion of the image.

7. The object detecting apparatus according to claim 4, wherein
   a condition that satisfies the predetermined criterion includes that the number of detection times that the degree of reliability greater than or equal to the first threshold value is detected reaches a second threshold value.

8. The object detecting apparatus according to claim 7, wherein
   the second threshold value is set higher with increasing amount of distortion of an area in the image.

9. The object detecting apparatus according to claim 7, wherein
   the second threshold value set to a peripheral portion of the image is greater than the second threshold value set to a central portion of the image.

10. The object detecting apparatus according to claim 1, wherein
    the evaluation value is a value indicating an angle of the predetermined object; and
    a condition that satisfies the predetermined criterion includes that the angle of the predetermined object is within a predetermined range.

11. The object detecting apparatus according to claim 10, wherein
    the predetermined range is set wider with increasing distortion of an area in the image.

12. The object detecting apparatus according to claim 10, wherein
    the predetermined range set in a peripheral portion of the image is wider than the predetermined range set in a central portion of the image.

13. The object detecting apparatus according to claim 1, wherein
    if the evaluation value satisfies the predetermined criterion, the determining determines whether the area detected by the detecting corresponds to the predetermined object, and if an area of an object corresponding to the predetermined object is detected in a subsequent detection, the control unit relaxes the predetermined criterion.

14. The object detecting apparatus according to claim 1, wherein the operations further comprises:
    determining a main object; and
    changing, if it is determined that the main object is being tracked, the predetermined criterion depending on the amount of distortion of the image.

15. The object detecting apparatus according to claim 14, wherein
    the determining of the main object determines whether the main object is being tracked by detecting a panning operation in a direction corresponding to a moving direction of the main object.

16. The object detecting apparatus according to claim 14, wherein
    the object detecting apparatus can be mounted to a pan head configured to support the object detecting apparatus, wherein
    the pan head includes:
       a supporting portion that changes an optical axis direction of the object detecting apparatus;
       a drive control unit that controls driving of the supporting portion; and
       a transmitter that transmits a driving instruction to the supporting portion,
    wherein, if a driving instruction corresponding to the moving direction of the main object is transmitted from the transmitter to the drive control unit, the control unit determines that the main object is being tracked.

17. The object detecting apparatus according to claim 14, wherein the operations further comprises:
    recording features of the predetermined object obtained from the image in association with the predetermined object,
    wherein if the determining determines that the predetermined object corresponding to the area detected by the detecting is the object recorded in the recording, the determining determines that the object is a main object.

18. The object detecting apparatus according to claim 1, wherein the operations further comprises: performing control so that, if the evaluation value satisfies the predetermined criterion, an indication of the predetermined object is displayed in an area of a display unit corresponding to the detected area.

19. The object detecting apparatus according to claim 1, wherein
the predetermined object is a human face area.

20. An image capturing apparatus comprising:
an image sensor which generates an image;
a processor; and
a memory coupled to the processor storing instructions that, when executed by the processor, cause the processor to perform operation comprising:
detecting an area of a predetermined object from the image;
calculating an evaluation value on the area detected by the detecting unit; and
determining, when the evaluation value satisfies a predetermined criterion, that the area is the predetermined object, wherein the predetermined criterion is set depending on an amount of distortion of the image.

21. The image capturing apparatus according to claim 20, wherein
when a process for correcting the distortion of an image is to be performed, the predetermined criterion does not change depending on the amount of distortion of the image.

22. The image capturing apparatus according to claim 20, wherein
an exchangeable lens including the imaging optical system can be mounted on the image capturing apparatus, and
wherein the determining determines whether to change the predetermined criterion depending on the amount of distortion of the image based on the amount of distorted aberration of the mounted exchangeable lens.

23. An object detecting apparatus comprising:
a processor; and
a memory coupled to the processor storing instructions that, when executed by the processor, cause the processor to perform operations comprising:
detecting an area of a predetermined object from an image;
calculating an evaluation value on the area detected by the detecting; and
controlling display of the image on a display unit,
wherein the controlling performs control so that, if the evaluation value satisfies a predetermined criterion, an indication of the predetermined object is displayed in an area of the display unit corresponding to the detected area, and
wherein the predetermined criterion is set depending on an amount of distortion of the image.

24. A method, performed by a processor, for controlling an object detecting apparatus, the method comprising:
detecting an area of a predetermined object from an image;
calculating an evaluation value on the detected area of the predetermined object; and
determining that the area is the predetermined object when the evaluation value satisfies a predetermined criterion,
wherein the predetermined criterion is set depending on an amount of distortion of the image.

25. A non-transitory storage medium storing computer executable instructions causing a computer to execute the method for controlling an object detecting apparatus, according to claim 24.

26. A method, performed by a processor for controlling an object detecting apparatus, the method comprising:
detecting an area of a predetermined object from an image;
calculating an evaluation value on the detected area of the predetermined object; and
controlling displaying the image on a display unit,
wherein if the evaluation value satisfies the predetermined criterion, an indication of the predetermined object is displayed in an area of the display unit corresponding to the detected area, and
wherein the predetermined criterion is set depending on an amount of distortion of the image.

27. A non-transitory storage medium storing computer executable instructions causing a computer to execute the method for controlling an object detecting apparatus, according to claim 26.

28. An object detecting apparatus comprising:
a processor; and
a memory coupled to the processor storing instructions that, when executed by the processor, cause the processor to perform operations comprising:
detecting an area of a predetermined object from an image;
calculating an evaluation value on the area detected by the detecting; and
determining, when the evaluation value satisfies a predetermined criterion, that the area is the predetermined object,
wherein a condition that satisfies that predetermined criterion includes that the number of detection times of a degree of reliability of the predetermined object greater than or equal to a first threshold value is detected reaches a second threshold value, and,
the second threshold value is set higher as the first threshold value is set lower.

29. The object detecting apparatus according to claim 28, wherein
the first threshold value set to a peripheral portion of the image is lower than the first threshold value set to a central portion of the image.

30. A method, performed by a processor for controlling an object detecting apparatus, the method comprising:
detecting an area of a predetermined object from an image;
calculating an evaluation value on the area detected by the detecting; and
determining, when the evaluation value satisfies a predetermined criterion, that the area is the predetermined object,
wherein a condition that satisfies the predetermined criterion includes that the number of detection times that of a degree of reliability of the predetermined object greater than or equal to a first threshold value is detected reaches a second threshold value, and
the second threshold value is set higher as the first threshold value is set lower.

31. A non-transitory storage medium storing computer executable instructions causing a computer to execute the method for controlling an object detecting apparatus, according to claim 30.

* * * * *